(12) United States Patent
Li et al.

(10) Patent No.: US 7,257,639 B1
(45) Date of Patent: Aug. 14, 2007

(54) ENHANCED EMAIL—DISTRIBUTED ATTACHMENT STORAGE

(75) Inventors: Lily C. Li, Cupertino, CA (US); Dan Teodosiu, Palo Alto, CA (US); Ryoji Watanabe, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 731 days.

(21) Appl. No.: 09/915,096

(22) Filed: Jul. 25, 2001

Related U.S. Application Data

(60) Provisional application No. 60/262,945, filed on Jan. 19, 2001.

(51) Int. Cl.
*G06F 15/16* (2006.01)

(52) U.S. Cl. ............ 709/232; 709/206; 709/217; 709/219

(58) Field of Classification Search ............ 709/206, 709/217, 219, 232
See application file for complete search history.

(56) References Cited

U.S. PATENT DOCUMENTS

| | | | | |
|---|---|---|---|---|
| 5,771,355 A * | 6/1998 | Kuzma | ............ | 709/232 |
| 5,781,902 A | 7/1998 | Waszkiewicz | | |
| 5,809,242 A | 9/1998 | Shaw et al. | | |
| 5,903,723 A * | 5/1999 | Beck et al. | ............ | 709/200 |
| 6,014,502 A | 1/2000 | Moraes | | |
| 6,434,602 B1 * | 8/2002 | Hazan et al. | ............ | 709/206 |
| 6,505,236 B1 * | 1/2003 | Pollack | ............ | 709/206 |
| 6,651,087 B1 * | 11/2003 | Dennis | ............ | 709/206 |
| 6,839,741 B1 * | 1/2005 | Tsai | ............ | 709/217 |
| 7,069,332 B2 * | 6/2006 | Shibata et al. | ............ | 709/231 |

FOREIGN PATENT DOCUMENTS

WO  WO 00/67133  11/2000

* cited by examiner

*Primary Examiner*—Moustafa Meky
*Assistant Examiner*—Avi Gold

(57) ABSTRACT

A sender email client, in response to a request to send an email with attachment, determines whether a recipient of the email has distributed storage separate from an incoming email server of the recipient for storing email attachments. If so, a location server is consulted for the distributed storage's network address and its availability is determined. The send request is then serviced accordingly. An email service, in response to receiving an email with attachment, determines whether a recipient of the email has distributed storage for storing email attachments. If so, its network address and availability are likewise determined. The attachments are forwarded to the recipient's distributed storage for storage, when it becomes available. An email recipient client, in response to a request to access an email attachment, retrieves the attachment from the recipient's distributed storage or the incoming email server, as appropriate.

29 Claims, 5 Drawing Sheets

Distributed Storage Location Table 300

| User ID ~ 302 | Distributed Storage Network Address ~ 304 | Current Availability ~ 306 |
|---|---|---|
| | | |
| | | |
| | | |
| | | |
| | | |

Fig. 4a　　　　　　　　　　　　Fig. 4b

ENHANCED EMAIL—DISTRIBUTED ATTACHMENT STORAGE

CROSS-REFERENCE TO RELATED APPLICATIONS

This non-provisional application claims priority to provisional application 60/262,945 filed Jan. 19, 2001, having the same inventorship as the present application and having the title, "SYSTEM AND METHOD OF DISTRIBUTING STORAGE, COMMUNICATION, AND COMPUTATIONAL NECESSITIES OF WEB-BASED EMAIL SERVICES."

BACKGROUND OF THE INVENTION

1. Field of the Invention

The present invention relates to the field of data processing. More specifically, the present invention relates to methods and systems associated with email service hosting and consumption.

2. Background Information

The popularity of Internet connectivity has contributed to the fast and persistent adoption of server applications in both the enterprise and the consumer space. The features and functionalities of a particular application are no longer confined to individual machines on which the application software is installed. Instead, these features can now be made available on the Internet or on the enterprise corporate network in an ongoing service model, accessible from any machines anywhere, anytime. Also, users do not have to keep up with the nuisance of software upgrades. Since new releases only have to be installed on the central server, users can immediately benefit from the feature upgrade via the Internet, without any of the complications of installation, configuration and system compatibility check. Some of the web-based applications that have become ubiquitous by now are email management and PIMs (Personal Information Management, including calendar, contacts and tasks).

However, such a convenience comes with a toll on bandwidth and storage cost, which are the primary cost drivers of server applications:

Bandwidth Cost

Since the processing power and database reside on the server, a high volume of data traffic is often created between server and client access points, and among servers themselves. To send bits from client A to client B, the supposedly straightforward data route from point A to point B now necessitates the intermediation of several servers in between, resulting in a significantly larger amount of traffic compared to a direct peer-to-peer connection.

As bandwidth is always subject to supply constraints due to its high capital cost and long lead time to deploy, ASPs and server applications have to strive hard for a way to reduce the data traffic while sustaining the same level of service to its customers.

Growth of Data Size

As server applications continue to upgrade their feature sets to include rich media formats (such as .JPG, .WAV and .MP3), the amount of data that needs to be transmitted and stored has grown significantly, to the point where the extra burden placed on bandwidth and storage has outpaced what can be viably offered by current-day technology. For instance, a textual email is typically only a few kilobytes in size; adding a 5-minute MP3-encoded song as an attachment can boost this size to about 5 megabytes, an increase of more than three orders of magnitude; video attachments add one more order of magnitude in size.

Storage Requirements

Storing copies of files for all subscribers on the server adds up to a hefty cost. In addition to directing and temporarily storing email before it reaches its final destination, some servers are also configured to keep backup copies of all email. For instance, the IMAP4 protocol keeps a copy of all received mail messages and attachments on the server unless instructed by the user to delete.

Such concentration of server storage model brings forth two problems:

First, there is a redundancy of storage beyond needs. For example, once an email is sent, the sender keeps the original copy of any attachments on his personal computer; the attachments also reside in the sent mail folder on his server. On the reception side, the receiver keeps a backup copy of the email and attachments on his mail server (which could be a operated by a different provider), and also downloads these to his desktop machine. Thus an attachment file meant for two parties now becomes populated on servers on both ends, exerting unnecessary burden on the storage needs of the intermediating servers. To wit, most web-based email services are currently only able to provide enough space to store one MP3-encoded song attachment per user mailbox; due to these size restrictions, users of these services cannot send video clips as email attachments at all Second, multiple copies of the same document residing on both servers and client machines tend to cause confusion when changes are made. Data integrity has always been a difficult problem to tackle, especially in a world that promotes ubiquitous access to the same data. For example, when the receiver of an attachment makes certain changes and sends them back to the author via a web-based email system, the sender needs to upload the document again, no matter how small the change is; this cycles the new version of the document through the same storage duplication as the incoming route. Not only does this approach make it hard to keep track of changing data, but it also contributes to redundant storage of the same file over and over again, although each copy may be only marginally different from each other.

In order to save bandwidth and server space for data that cannot be handled otherwise, a huge opportunity exists to leverage the under-utilized storage space, processing power, and network bandwidth of the user machines themselves. This opportunity is based on a distributed computing model to assist certain server functions, and to allow server intermediation to be forgone as appropriate. Redundant storage of the same document can be minimized. This not only saves bandwidth and disk storage costs for the operators, but also enhances the performance of data transfer, and makes it easier to keep data distributed and synchronized at a much faster speed.

SUMMARY OF THE INVENTION

A sender email client, in response to a request to send an email with attachment, determines whether a recipient of the email has distributed storage separate from an incoming email server of the recipient for storing email attachments. If so, a location server is consulted for the distributed storage's network address and its availability is determined. The send request is then serviced accordingly.

A location server, in response to a request to register a user's email attachment distributed storage, registers the distributed storage's network address. The location server provides a requestor with the registrant's distributed storage's network address, when requested.

An email service, in response to receiving an email with attachment, determines whether a recipient of the email has distributed storage for storing email attachments. If so, its network address and availability are likewise determined. The attachments are forwarded to the recipient's distributed storage for storage, when it becomes available.

An email recipient client, in response to a request to access an email attachment, retrieves the attachment from the recipient's distributed storage or the incoming email server, as appropriate.

BRIEF DESCRIPTION OF DRAWINGS

The present invention will be described by way of exemplary embodiments, but not limitations, illustrated in the accompanying drawings in which like references denote similar elements, and in which:

FIGS. 4a-4b illustrate the operational flow of the relevant aspects of a location server of FIG. 1, in accordance with one embodiment;

DETAILED DESCRIPTION OF THE INVENTION

As summarized earlier, the present invention includes improved methods and related apparatuses for hosted email services. In the description to follow, various aspects of the present invention will be described. However, the present invention may be practiced with only some or all aspects of the present invention. For purposes of explanation, specific numbers, materials and configurations are set forth in order to provide a thorough understanding of the present invention. However, the present invention may be practiced without some of the specific details. In other instances, well known features are omitted or simplified in order not to obscure the present invention.

Parts of the description will be presented in terms of operations performed by a processor based device, using terms such as data, tables, requesting, determining sending, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical, or optical components of the processor based device. The term "processor" includes microprocessors, micro-controllers, digital signal processors, and the like, that are standalone, adjunct or embedded.

Various operations will be described as multiple discrete steps in turn, in a manner that is most helpful in understanding the present invention. However, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1:
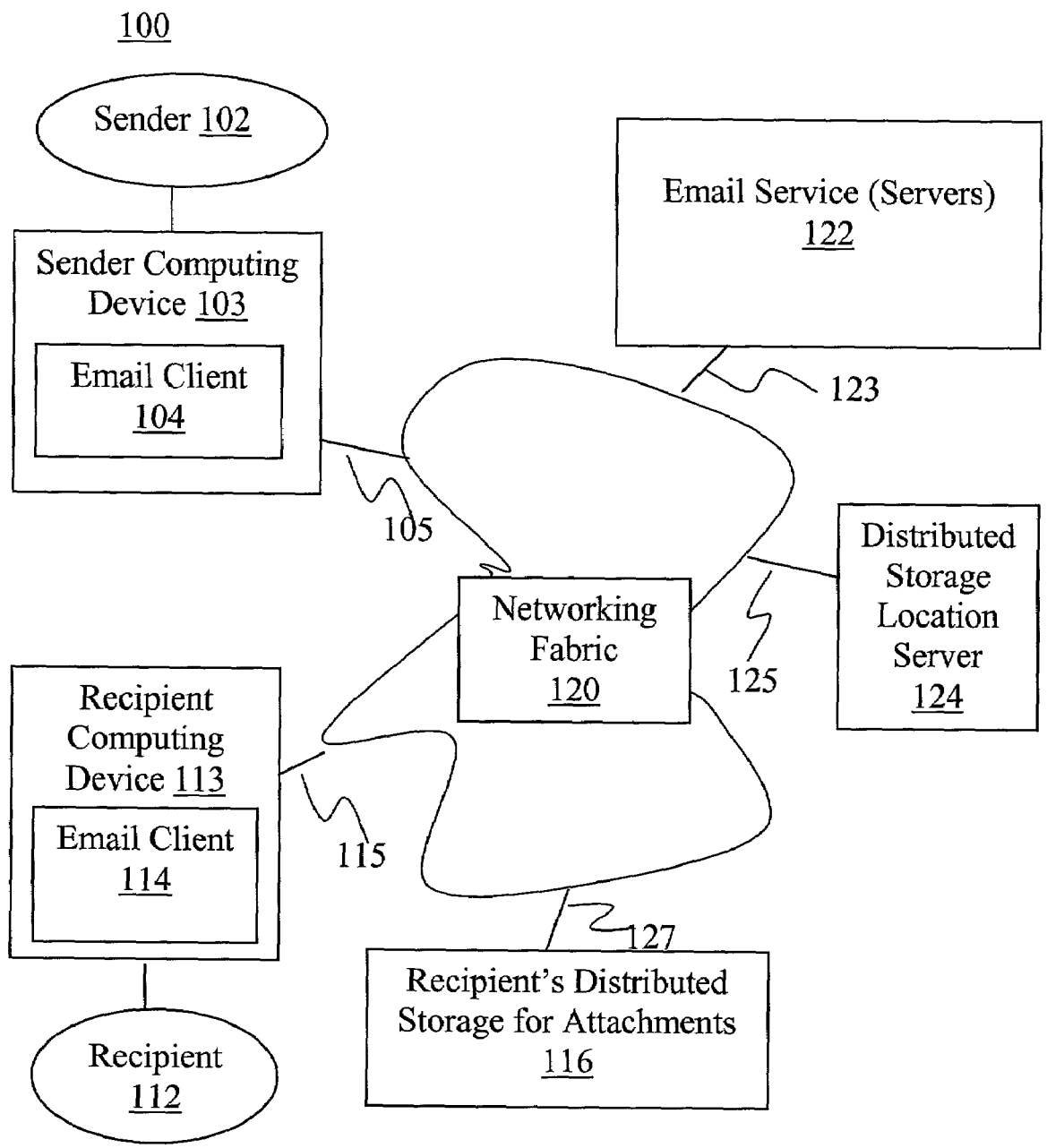
FIG. 1 illustrates a network view of the present invention in accordance with one embodiment.

Referring now first to FIG. 1, wherein a block diagram illustrating a network view of the present invention, in accordance with one embodiment, is shown. As illustrated, email sender 102 and email recipient 112, more specifically, their respective computing devices 103 and 113 are coupled to each other, via networking fabric 120. Each of computing devices 103 and 113 is equipped with a email client, client 104 and 114 respectively. Clients 104 and 114 are both incorporated with the teachings of the present invention, to be described more fully below. For ease of understanding, both email clients 104 and 114 are client programs or agents of hosted email service 122. However, from the description to follow, those skilled in the art will appreciate that each of email clients 104 and 114 may be a client program/agent of different hosted email service or email servers. Those skilled in the art will furthermore appreciate that in one embodiment, client 104 could be also part of an agent or hosted email service. In this embodiment, client 104 could be the outgoing (or "send") path of an existing email agent or hosted email service (for instance, in one embodiment, client 104 could be an enhanced Microsoft Exchange server).

Host email service 122 is also incorporated with the teachings of the present invention, also to be described more fully below. Hosted email service 122, more specifically, the server or servers hosting email service 122 (including the incoming and outgoing email servers), are coupled to computing devices 103 and 113 through networking fabric 120.

Additionally, in accordance with the present invention, recipient 112 is also endowed with distributed storage 116 for storing email attachments for recipient 112. Further, present in the networking environment is distributed storage location service 124 for providing requestors with network addresses of and availability information for distributed storages 116 of registered recipient users. As with earlier enumerated elements, distributed storage 116 and distributed storage location service 124 (more specifically, its server or servers) are coupled to each other and the earlier enumerated elements via networking fabric 120.

In accordance with the present invention, when sender 102, via its email client 104, sends an email with attachment, to recipient 112, while the main body of the email is sent to the incoming email server of recipient 112, i.e. email service 122, as in the prior art, the email attachment, on the other hand, is advantageously sent to distributed storage 116 for storage instead, except when distributed storage 116 is unavailable. As a result, email service 122 is relieved of the responsibility or burden of storing email attachments for recipient 112 (as well as other likewise endowed recipient service subscribers). As those skilled in the art will appreciate that the resulting storage savings to email service 122 could be substantial, especially when email service 122 services a large number (for instance, hundreds of thousands) of service subscribers, or is frequently used to send very large attachments.

Computing devices 103 and 113 may be any one of a broad range of computing devices known in the art, including but are not limited to, palm sized personal digital assistants, notebook sized computers, desktop computers, set top boxes and so forth. Similarly, any one of a number of servers known in the art may be employed to host email service 122, and distributed storage location server 124. Likewise, any one of a number of network addressable storage devices, computers or devices of like type may be employed to practice the distributed storage aspect of the present invention.

Networking fabrics 120 may be private and/or public network or networks inter-networked together. In one embodiment, networking fabric 120 is the Internet. Communication links 105, 115, 123, 125 and 127 coupling computing devices 103, 113, email server 122, location server 124 and distributed storage 116 to networking fabrics 120 respectively may be any one of a number of wireless or wired communication links known in the art, including but not limited to, Ethernet connections, modem connections, Integrated Service Digital Network (ISDN) connections, Digital Subscriber Line (DSL) connections, Cable connections, Asynchronous Transfer Mode (ATM) connections, Frame Relay connections and so forth.

Communications between computing devices 103, 113, servers of email service 122, location service 124, and distributed storage 116 may be conducted using any one of a number of message and communication protocols known in the art. In one embodiment, the communications are achieved via Hypertext Transmission Protocol (HTTP) connections, with the packets being sent and received in accordance with the Transmission Control Protocol/Internet Protocol (TCP/IP).

Similarly, except for the teachings of the present invention incorporated therein, email service 122 and email clients 104 and 114 may be any one of a number email server/client pairs known in the art. In the afore mentioned embodiment, email service 122 is a web based service, and email clients 104 and 144 are web pages and associated applets or objects executing in a generic agent, such as a web browser.

Further, while for ease of understanding, only one email sender 102 and one email recipient 112 are shown, from the description to follow, those skilled in the art would appreciate that the present invention may be practiced with numerous email senders and recipients. In fact, the present invention may be practiced in co-existence with the prior art, i.e. not all senders and/or recipients, nor email services have to be enhanced with teachings of the present invention. Those who have been will enjoy the benefits of the present invention. Otherwise, the senders and recipients, with or without the present invention co-exist together.

Sender and Recipient

Figure 2:
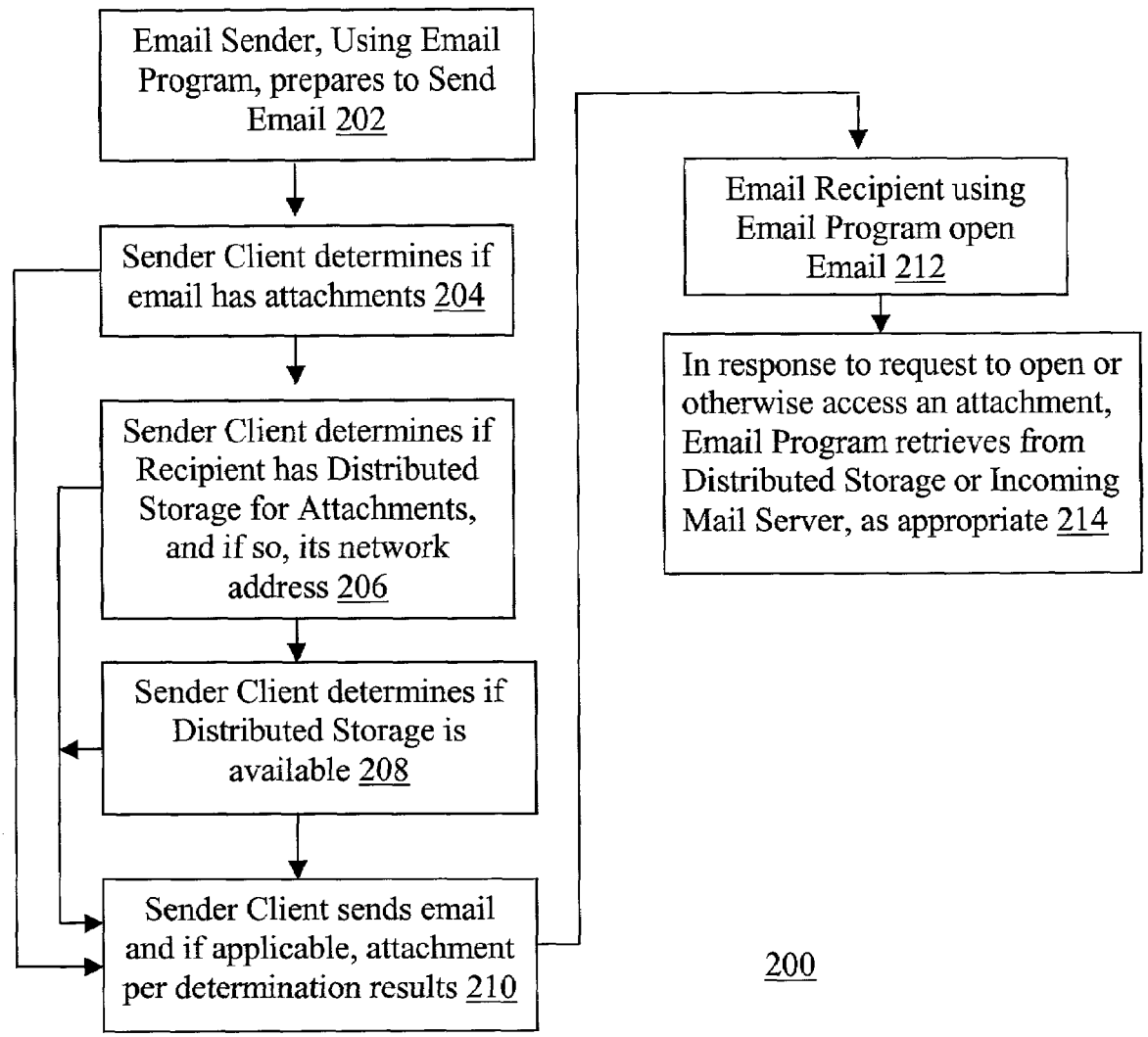
FIG. 2 illustrates a sender and recipient method view of the present invention, in accordance with one embodiment.

Having now generally described the context for practicing the present invention, we turn now to describe the present invention in further details from the sender and the recipient's perspective. Referring now to FIG. 2, wherein a block diagram illustrating the present invention from the sender and the recipient's method view is shown. As illustrated, the method starts with email sender 102 using email client 104 to compose and send an email message to recipient 112, block 202. In response to a request to send the email, email client 104 checks to determine whether the email to be sent has attachments, block 204.

If it is determined that the email to be sent has any attachments, email client 104 further proceeds to determine whether a specified recipient is endowed with a distributed storage (116 of FIG. 1) for storing email attachments in accordance with the present invention, and if so, its network address, block 206. For the illustrated embodiment, this information is obtained by advantageously using the distributed storage location server 124. If it is determined that the specified recipient being process is endowed with such distributed storage, email client 104 further determines if the distributed storage is currently accessible, block 208.

Email client 104 then services the send request based on the results of these determinations, block 210. More specifically, for the illustrated embodiment, if it is determined that the specified recipient being processed is endowed with such distributed storage, and the distributed storage is currently accessible, email client 104 sends the main body of the email to the incoming email server of the specified recipient, and causes the attachment or attachments to be sent to distributed storage of the specified recipient for storage. On the other hand, if it is determined that either the recipient is not endowed with such distributed storage, or it is endowed, but its distributed storage is currently inaccessible (e.g. currently not online), email client 104 sends both the main body as well as any attachment to the incoming email server of the specified recipient being processed.

For the illustrated embodiment, email client 104 determines whether a specified recipient being processed is endowed with such distributed storage (including its network address) by querying a distributed storage location server (such as distributed storage location server 124 of FIG. 1). In one embodiment, if the specified recipient is endowed with such distributed storage, location server 124 returns the network address automatically; otherwise location server 124 returns a null value (or alternatively, an error code). In another embodiment, location server 124 additionally returns an attribute bit denoting whether the recipient's distributed storage is currently available.

In one embodiment, email client 104 determines the current availability of the distributed storage by pinging the distributed storage. In one embodiment, the affirmative verification is made regardless of the qualifying attribute information returned from location server 124. In another embodiment, email client 104 relies on the availability information returned by location server 124.

In one embodiment, upon determining a recipient is endowed with such distributed storage, and the distributed storage is currently accessible, email client 104 "sends" the attachment or attachments to the recipient by sending an instruction to the distributed storage to "pull" the attachment or attachments. In response, the distributed storage "pulls" accordingly. In one embodiment, the recipient is an agent or hosted email service; in this embodiment, the agent or hosted service implements the necessary features (or a logical recipient) to support the above steps.

In one embodiment, when more than one recipient is specified for an email with attachment, blocks 206-210 are repeated for each specified recipient. In one embodiment, a recipient may be explicitly specified or implicitly specified by way of a group address. In one embodiment, email client 104 accesses address books of sender 102 to determine if any specified addressee is a group addressee and resolves the individual recipients based on the content of the address books.

Continuing to refer to FIG. 2, over at the recipient side, eventually, recipient 112 uses email client 114 to open a received email to view the email, block 212. Assuming the email has one or more attachments, eventually, recipient 112 opens or otherwise accesses the attachment (e.g. to save or otherwise extract the attachment from received email), block 214. In response, email client 114 first accesses its distributed storage to attempt to retrieve the attachment. If the attempt is unsuccessful, i.e. the attachment of interest is not in the distributed storage (this corresponds to the case where the attachment could not be deposited into distributed storage by email client 104), email client 114 retrieves the attachment from its incoming email server.

Recall from the earlier description that the attachment or attachments are nevertheless sent to the recipient's incoming email server if the recipient's distributed storage is unavailable (even though recipient has been so endowed), or if the recipient has not been endowed with the teachings of the present invention. Further note that none of these operations will be performed, and email services will progress as in the prior art, if one or both the sender and the recipient are not enhanced with the teachings of the present invention. Operation of the incoming email server will be described in further detail below.

Location Server

Figure 3:
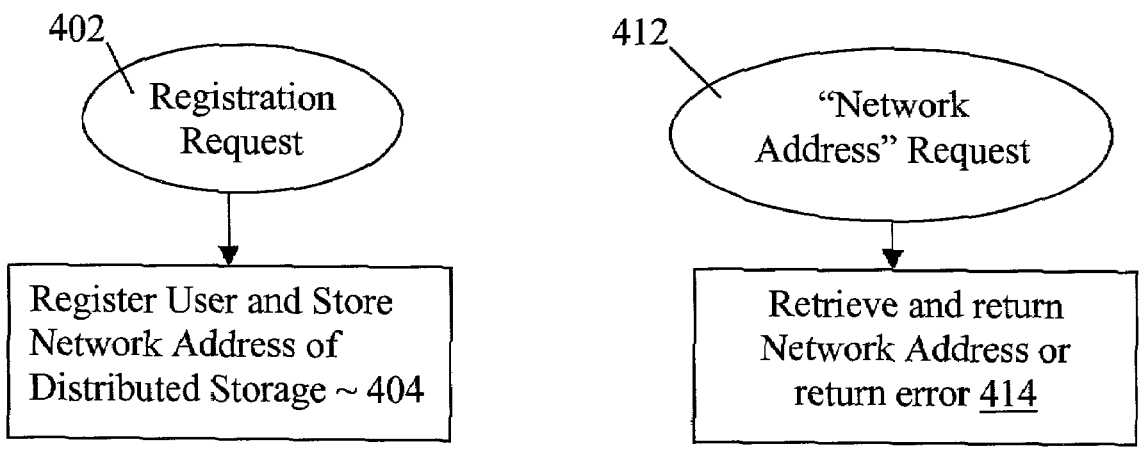
FIG. 3 illustrates an example data structure suitable for use by a location server of FIG. 1 to practice the present invention, in accordance with one embodiment.

Referring now to FIG. 3, wherein a data structure suitable for use by distributed storage location server 124 to practice the location server aspect of the present invention, in accordance with one embodiment, is shown. Shown is a table/view 300 having network addresses 304 of the distributed storages of the registered subscribers 302 of location server 124. In alternate embodiments, other data organizations may be employed. In alternate embodiments, table 300 also stores the current availability of distributed storage 306.

FIGS. 4*a*-4*b* illustrate the operational flow of the relevant aspects of location server 124, in accordance with one embodiment. As illustrated in FIG. 4*a*, in response to a registration request of a new service subscriber, block 402, location server 404 registers the subscriber user, and stores the network address of the subscriber user's distributed storage for storing email attachments. In one embodiment, the network address of the distributed storage of the subscriber user is provided to location server 124 as part of the registration process, if the distributed storage has a statically assigned network address. In one embodiment, location server 124 also supports dynamic provision of the network address, when the distributed storage is dynamically assigned its network address when it comes online. In a preferred implementation of this embodiment, support is also provided to the distributed storage to notify location server 124 when the distributed storage goes offline (thereby allowing location server 124 to remove the temporal dynamic network address from its storage). In an alternate embodiment, distributed storage will be considered unavailable and marked as such in table 300 column 306 if it hasn't "pinged" location server 124 for a specified time.

As illustrated in FIG. 4*b*, in response to a request for a recipient's distributed storage's network address, block 412, as described earlier, location server 124 returns the network address, or a null value/error code, as the case may be. Recall from earlier description, the request for the network address may be implicit, and automatic. That is, the network address may be automatically returned in response to an inquiry on whether a recipient is endowed with a distributed storage for storing email attachments. The request/response operation may be performed in accordance with any predetermined protocols.

Email Service—Incoming Email Server

Figure 5:
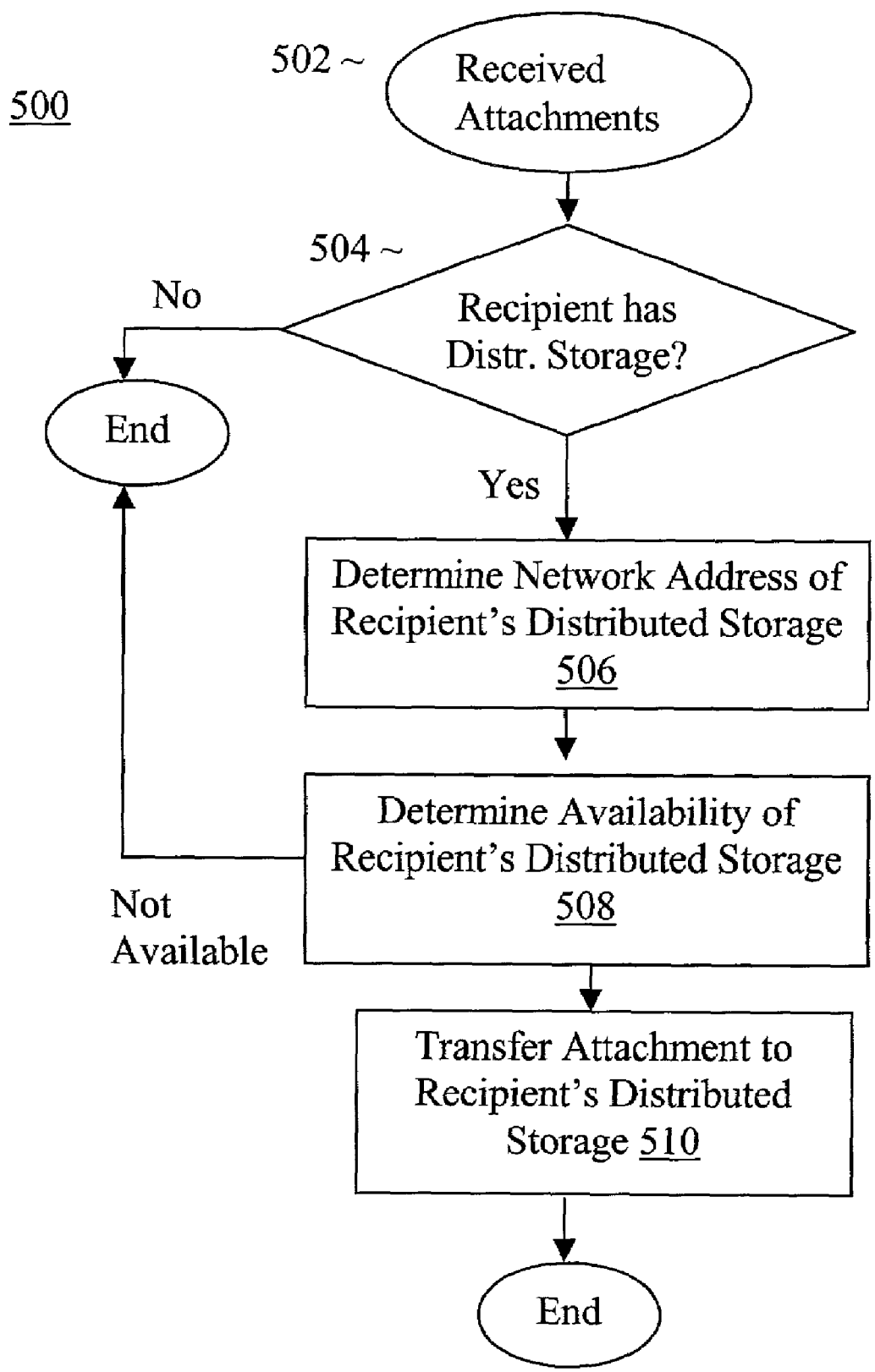
FIG. 5 illustrates the operational flow of the relevant aspects of the enhanced email program/service of FIG. 1, in accordance with one embodiment.

Referring now to FIG. 5, wherein a block diagram illustrating the operation flow of the relevant aspects of email service 122 (more specifically, the incoming email server of recipient), in accordance with one embodiment, is described.

As illustrated, in response to the receipt of an email with attachment or attachments from a sender, on behalf of a recipient, block 502, email service 122 determines whether the recipient is endowed with distributed storage for storing email attachments, block 504. Email service 122 also determines the network address of the distributed storage, block 506. As described earlier, email service 122 may nevertheless receive email attachments on behalf of a recipient, notwithstanding the recipient has been endowed with distributed storage for storing email attachments. The reason being, the endowed distributed storage may be unavailable at time email sender sends the email with attachment, or the email is sent by a client that has not been endowed with the teachings of the present invention. In one embodiment, the two operations, i.e. determining whether a recipient is endowed with the distributed storage, and the network address of the distributed address, are integrally performed.

Similar to the manner sender email client 104 operates, upon determining the network address of the distributed storage of a recipient, email service 122 periodically checks for the availability of the recipient's distributed storage to determine whether the distributed storage becomes available (e.g. coming back online). Once it is determined that the distributed storage of interest is available, email service 122 automatically transfers the received attachment or attachments to the recipient's distributed storage for storage.

Note that while it is preferred that email service 122 is also enhanced to be able to offload this storage burden once the distributed storages of the recipients come back online, the present invention may nevertheless be practiced without email service 122 being enhanced. In these embodiments, the benefits of the present invention will only be realized in those situations where the recipient's distributed storages are online at the time the senders send the attachments or at the time the receiving service receives the attachments.

Example Computer System

Figure 6:
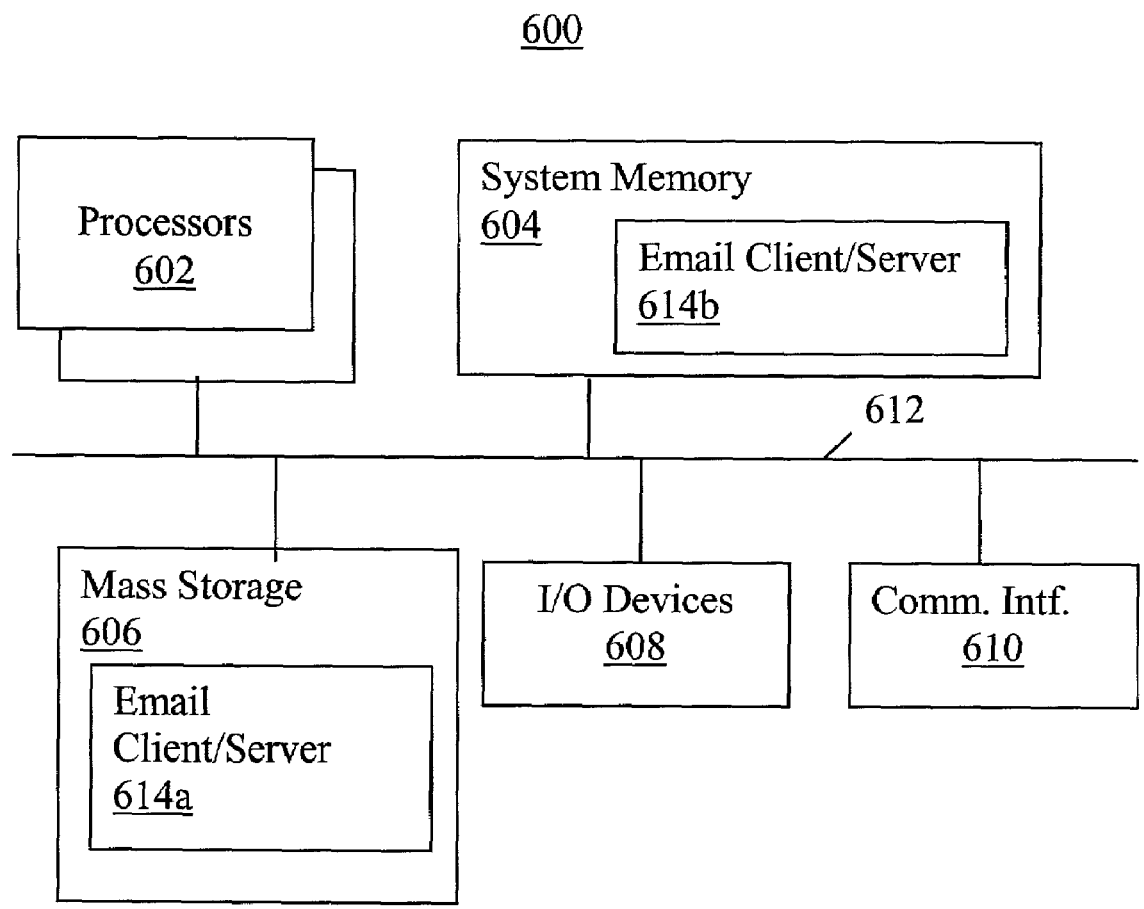
FIG. 6 illustrates an example computer system suitable for use to practice the present invention, in accordance with one embodiment.

FIG. 6 illustrates an exemplary computer system 600 suitable for use as either a sender/recipient computer 1031113 or a hosting server of email service 124 of FIG. 1, in accordance with one embodiment. As shown, computer system 600 includes one or more processors 602 and system memory 604. Additionally, computer system 600 includes one or more mass storage devices 606 (such as diskette, hard drive, CDROM and so forth), one or more input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the teachings of the present invention. The permanent copy of the programming instructions may be loaded into mass storage 606 in the factory, or in the field, as described earlier, through a distribution medium (not shown) or through communication interface 610 (from a distribution server (not shown). The constitution of these elements 602-612 are known, and accordingly will not be further described.

While example computer system 600 has been described as being suitable for use as computing device 103/113 or a hosting server of email service 122, those skilled in the art will also appreciate that example computer system 600 may also be used to practice the location server aspect of the present invention, or the distributed storage itself.

Modifications and Alterations

While the present invention has been described referencing the illustrated and above enumerated embodiments, the present invention is not limited to these described embodiments. Numerous modification and alterations may be made, consistent with the scope of the present invention as set forth in the claims to follow. For example, while distributed storage 116, for ease of understanding, has been described as separate and distinct from the recipient's computing device 113, the present invention may also be practiced with the recipient's computing device 113 and distributed storage 116 being the same device. Similarly, while for ease of understanding, location server 124 has also been described as separate and distinct from the hosting server of email service 122, the present invention may also be practiced with email service 122 also providing for location service 124. Further, while the recipient's distributed storage being offline has been described as a responsibility of email service 122 to address, the present invention may also be modified and practiced with the responsibility being that of the sender's email client (104 of FIG. 1). Similarly, while email client 104 has been described as a client program or agent of hosted email service 122, the present invention may be practiced with email client 104 being part of the same email service 122 or of a different email service. Of course, the above examples are merely illustrative. Based on the above descriptions, many other equivalent variations will be appreciated by those skilled in the art.

CONCLUSION AND EPILOGUE

Thus, a method and apparatus for an enhanced email service with less bandwidth and storage burden to the email service, in particular, web based email service, has been described. Since as illustrated earlier, the present invention may be practiced with modification and alteration within the spirit and scope of the appended claims, the description is to be regarded as illustrative, instead of being restrictive on the present invention.

What is claimed is:

1. A method for servicing email at a client of a sender of an email comprising:
   receiving a request at the client of the sender to send the email to a recipient, the email containing a main body and one or more attachments and the recipient having an incoming email server for receiving at least a portion of the email;
   determining at the client of the sender whether the recipient has a corresponding distributed storage separate from the incoming email server;
   determining at the client of the sender an availability of the distributed storage based on determining the recipient has a corresponding distributed storage;
   if the recipient has the available corresponding distributed storage:
   sending the main body of the email from the client of the sender to the incoming email server of the recipient; and
   sending the one or more attachments of the email from the client of the sender to the corresponding distributed storage;
   otherwise, sending the main body of the email and the one or more attachments from the client of the sender to the incoming email server.

2. The method of claim 1, wherein said determining whether the recipient has a corresponding distributed storage separate from the incoming email server comprises querying a recipient email distributed storage location server.

3. The method of claim 1, further comprising determining a network address of the distributed storage for storing email attachments and querying a recipient email distributed storage location server.

4. The method of claim 1, wherein said determining the availability comprises pinging the recipient's email distributed storage using said determined network address.

5. The method of claim 1, further comprising sending the main body of the email and the one or more attachments of the email to the incoming email server of the recipient if the recipient has distributed storage but the distributed storage is not available.

6. The method of claim 1, further comprising sending the main body of the email and the one or more attachments of the email to the incoming email server of the recipient if the recipient does not have the distributed storage.

7. A method for servicing email at a server comprising:
   receiving at the server an email on behalf of a recipient, the email including a main body and one or more attachments;
   transmitting a query to a storage location server;
   responsive to the transmitting, if the recipient has a distributed storage, separate from the email server, for storing email attachments, receiving from the storage location server a network address of the distributed storage corresponding to the recipient, otherwise receiving a first indication that the recipient does not have a distributed storage;
   receiving periodically a second indication for indicating availability of the distributed storage to receive the one or more attachments; and
   sending the one or more attachments of the email to the recipient's distributed storage for email attachments based on receiving the network address and the second indication.

8. The method of claim 7, wherein the recipient includes an incoming email server separate from the distributed storage and wherein responsive to receiving the first indication, sending the main body and the one or more attachments of the email to the incoming email server.

9. The method of claim 7, wherein the network address is received from the storage location server and wherein the second indication is received responsive to pinging the recipient's email distributed storage using the network address.

10. A method for servicing email at a client of a recipient of an email comprising:
    receiving at the client of the recipient of the email a request from a user in a peer-to-peer communication system to access an attachment of an email;
    determining accessibility of a distributed storage;
    determining if the attachment is stored in said distributed storage; and
    if the distributed storage is accessible and contains the attachment, retrieving the attachment from the distributed storage, otherwise retrieving the attachment from an incoming email server, the incoming email server being separate from the distributed storage.

11. The method of claim 10, wherein said determining accessibility of the distributed storage comprises pinging the distributed storage for email attachments.

12. The method of claim 10, wherein said retrieving the attachment further comprises retrieving the attachment from the distributed storage for storing email attachments if the distributed storage for storing email attachments is accessible, and the attachment is stored in the distributed storage for storing email attachments.

13. The method of claim 10, wherein retrieving the attachment further comprises retrieving the attachment from an incoming email server of the user if the distributed storage for storing email attachments is accessible, and the attachment is not stored in the distributed storage for storing email attachments.

14. The method of claim 10, wherein retrieving the attachment further comprises attempting to retrieve the attachment from an incoming email server of the user if the distributed storage for storing email attachments is not accessible.

15. An apparatus comprising:
a storage medium having stored therein a plurality of executable programming instructions that, when executed, perform the following steps for servicing email at a client of a sender of an email:
receiving a request to send an email to a recipient in a peer-to-peer communication system, the email containing a body and one or more attachments;
identifying an incoming email server corresponding to the recipient;
identifying a distributed storage of the recipient separate from the incoming email server;
determining availability of the distributed storage to receive the one or more attachments; and
transmitting the email based at least in part on the results of said determination; and
a processor coupled to the storage medium to execute the programming instructions.

16. The apparatus of claim 15, wherein said programming instructions are further configured to send the one or more attachments of the email to the recipient's distributed storage, if the recipient has distributed storage for storing email attachments, and the distributed storage is available to accept said one or more attachments.

17. The apparatus of claim 15, wherein said programming instructions are further configured to send an instruction to the recipient's distributed storage to submit a request for the one or more attachments of the email, if the recipient has distributed storage for storing email attachments, and the distributed storage is available to accept said one or more attachments.

18. The apparatus of claim 17, wherein said programming instructions are further configured to send the one or more attachments of the email to the recipient's distributed storage for email attachments upon receipt of a request from the recipient's distributed storage for the one or more attachments of the email.

19. The apparatus of claim 15, wherein said programming instructions are further configured to retry to send the one or more attachments of the email to the recipient's distributed storage in accordance with a retry policy, if the recipient has distributed storage and the distributed storage is not immediately available to accept said one or more attachments.

20. The apparatus of claim 15, wherein said programming instructions are further configured to send the one or more attachments of the email to the incoming email server of the recipient if the recipient has distributed storage and the distributed storage is not available to accept said one or more attachments.

21. The apparatus of claim 15, wherein said programming instructions are further configured to send the one or more attachments of the email to the incoming email server of the recipient if the recipient does not have distributed storage for email attachments.

22. An apparatus comprising:
a storage medium having stored therein a plurality of executable programming instructions that, when executed, perform the following steps for servicing email at a client in a peer-to-peer communication system:
receiving at the client an email, from a server, on behalf of a recipient, the email including a main body and one or more attachments;
determining whether the recipient of the email has distributed storage, separate from the server, for storing email attachments by querying a recipient email distributed storage location server;
determining a network address of the recipient's distributed storage for storing email attachments, if the recipient has such distributed storage;
periodically determining whether the recipient's distributed storage is available to receive the one or more attachments upon determining the network address; and
sending the one or more attachments of the email to the recipient's distributed storage for email attachments for storage, upon determining that the recipient's distributed storage for email attachments is available to accept email attachments; and
a processor coupled to the storage medium to execute the programming instructions.

23. The apparatus of claim 22, wherein said programming instructions are further configured to send an instruction to the recipient's distributed storage for email attachments, instructing the recipient's distributed storage for email attachments to submit a request for the one or more attachments of the email.

24. The apparatus of claim 23, wherein said programming instructions are further configured to enable the apparatus to send the one or more attachments of the email to the recipient's distributed storage for email attachments upon receipt of a request from the recipient's distributed storage for the one or more attachments of the email.

25. An apparatus comprising:
a storage medium having stored therein a plurality of executable programming instructions that, when executed perform the following steps for servicing email, from a server, at a client of a recipient
receiving a request from a user to access an attachment of an email;
determining whether a distributed storage, separate from the server, for storing email attachments for the user is accessible;
determining whether the attachment is stored in said distributed storage if said distributed storage is accessible; and
accessing said attachment of said email at said distributed storage if the distributed storage is accessible and contains the attachment, otherwise accessing the attachment at an incoming email server; and a processor coupled to the storage medium to execute the programming instructions.

26. The apparatus of claim 25, wherein the programming instructions are further configured to ping the user's distributed storage for email attachments to determine whether the user's distributed storage for email attachments is accessible.

27. The apparatus of claim 25, wherein the programming instructions are further configured to perform the servicing of said request by retrieving the attachment from the user's distributed storage for storing email attachments if the user's distributed storage for storing email attachments is accessible, and the attachment is stored in the user's distributed storage for storing email attachments.

28. The apparatus of claim 25, wherein the programming instructions are further configured to perform the servicing of said request by retrieving the attachment from an incoming email server of the user if the user's distributed storage for storing email attachments is accessible, and the attachment is not stored in the user's distributed storage for storing email attachments.

29. The apparatus of claim 25, wherein the programming instructions are further configured to perform the servicing of said request by attempting to retrieve the attachment from an incoming email server of the user if the user's distributed storage for storing email attachments is not accessible.

\* \* \* \* \*